United States Patent
Won

(10) Patent No.: US 8,488,493 B2
(45) Date of Patent: Jul. 16, 2013

(54) APPARATUS AND METHOD FOR AUTOMATIC ACCESS IN A WIRELESS COMMUNICATION SYSTEM

(75) Inventor: Sang-Yeon Won, Seoul (KR)

(73) Assignee: Samsung Electronics Ltd., Co., Suwon-si (KR)

( * ) Notice: Subject to any disclaimer, the term of this patent is extended or adjusted under 35 U.S.C. 154(b) by 188 days.

(21) Appl. No.: 13/076,758

(22) Filed: Mar. 31, 2011

(65) Prior Publication Data
US 2011/0243033 A1 Oct. 6, 2011

(30) Foreign Application Priority Data
Mar. 31, 2010 (KR) ........................ 10-2010-0029553

(51) Int. Cl.
*H04L 12/28* (2006.01)
(52) U.S. Cl.
USPC ............ 370/254; 370/331; 455/436; 455/437
(58) Field of Classification Search
None
See application file for complete search history.

(56) References Cited

U.S. PATENT DOCUMENTS

| | | | |
|---|---|---|---|
| 2005/0030922 A1* | 2/2005 | Lee et al. | 370/331 |
| 2007/0047492 A1* | 3/2007 | Kim et al. | 370/331 |
| 2008/0198823 A1* | 8/2008 | Shiu et al. | 370/338 |
| 2011/0243033 A1* | 10/2011 | Won | 370/254 |

* cited by examiner

*Primary Examiner* — Robert Wilson
(74) *Attorney, Agent, or Firm* — Jefferson IP Law, LLC

(57) ABSTRACT

An apparatus and a method for automatic access in a wireless communication system are provided. The apparatus includes a scanner for scanning surrounding Access Points (APs) by receiving beacon messages from the APs, a determiner for detecting an AP, a WPS button of which has been pressed, from one or more scanned APs and for determining if there are two or more detected APs, and a configurator for, when there are two or more detected APs, transmitting a message including a Medium Access Control (MAC) address of an AP, which has been selected among the detected APs by an input of a user, to the AP and for performing a Wi-Fi Protected Setup (WPS) with the selected AP, thereby accessing a wireless Local Area Network (LAN).

16 Claims, 3 Drawing Sheets

APPARATUS AND METHOD FOR AUTOMATIC ACCESS IN A WIRELESS COMMUNICATION SYSTEM

PRIORITY

This application claims the benefit under 35 U.S.C. §119(a) of a Korean patent application filed in the Korean Intellectual Property Office on Mar. 31, 2010 and assigned Serial No. 10-2010-0029553, the entire disclosure of which is hereby incorporated by reference.

BACKGROUND OF THE INVENTION

1. Field of the Invention

The present disclosure relates to a wireless communication system. More particularly, the present invention relates to an apparatus and a method for automatic access in a wireless communication system.

2. Description of the Related Art

A wireless Local Area Network (LAN) repeater of the related art corresponds to a device for receiving data from an Access Point (AP) and transferring the data to User Equipments (UEs) connected to the AP. The wireless LAN is mainly used in order to increase the cell coverage and the accessible distance range of an AP providing a communication access for UEs located in a fixed cell area. For connection between the wireless LAN repeater and the AP, information for access to the counterpart (such as Medium Access Control (MAC) address information, Service Set Identifier (SSID), and security information) should be stored in each of the wireless LAN repeater and the AP.

In order to store such information, a manager should individually identify the information and manually setup the AP and the wireless LAN repeater. However, if the manager is not familiar with various wireless LAN repeaters, it is difficult for the manager to know the MAC addresses of the wireless LAN repeaters and it is thus necessary for the manager to learn the details of each wireless LAN repeater and set each wireless LAN repeater each time.

Therefore, there is a need for a scheme capable of automatically connecting a UE to an AP without a separate process.

SUMMARY OF THE INVENTION

Aspects of the present invention are to address at least the above-mentioned problems and/or disadvantages and to provide at least the advantages described below. Accordingly, an aspect of the present invention is to provide a User Equipment (UE) that can automatically connect with an Access Point (AP) without a separate process or a special knowledge when a user of the UE wants to use a wireless Local Area Network (LAN).

Another aspect of the present invention is to provide a UE that can select and access a particular AP when there is an overlapping session.

In accordance with an aspect of the present invention, an apparatus for automatic access in a wireless communication system is provided. The apparatus includes a scanner configured to scan surrounding APs by receiving beacon messages from the APs, a determiner configured to detect an AP having a Wi-Fi Protected Setup (WPS) button which has been pressed from among one or more scanned APs, and for determining if there are two or more detected APs, and a configurator configured to, when there are two or more detected APs, transmit a message including a Medium Access Control (MAC) address of an AP, which has been selected among the detected APs by an input of a user, to the selected AP and performing a WPS with the selected AP, thereby accessing a wireless LAN.

In accordance with another aspect of the present invention, a method for automatic access to an Access Point (AP) in a wireless communication system by a piece of User Equipment (UE) is provided. The method includes scanning surrounding APs by receiving beacon messages from the APs, detecting an AP having a WPS button which has been pressed from among one or more scanned APs, determining if there are two or more detected APs, and, when there are two or more detected APs, transmitting a message including a MAC address of an AP, which has been selected among the detected APs by an input of a user, to the selected AP and performing a WPS with the selected AP, thereby accessing a wireless LAN.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
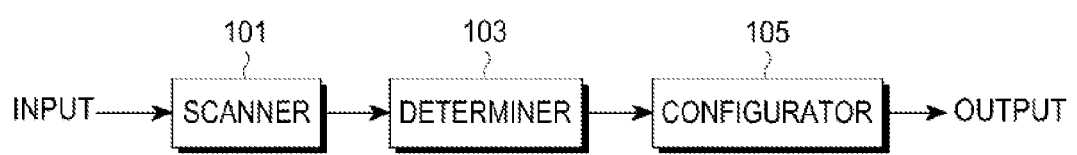
FIG. 1 is a block diagram illustrating a User Equipment (UE) according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Wi-Fi Protected Setup (WPS) is a standard that enables a user to easily setup a wireless Local Area Network (LAN) without information on a Service Set Identifier (SSID) of the wireless LAN, the security, etc. and is based on the Institute of Electrical and Electronics Engineers (IEEE) 802.11 specification.

The WPS includes a push button scheme and a Personal Identification Number (PIN) scheme.

The push button scheme refers to a scheme in which configuration information of an Access Point (AP) is transferred to a client by pressing buttons provided at the AP and the client device so that the client can access the AP based on the configuration information.

The push button scheme involves pressing a button for WPS in the AP and pressing a button on the client device. However, most devices, such as a Universal Serial Bus (USB) of a Personal Computer (PC) and a wireless LAN stick, do not have a button. Therefore, a process of finding a menu for WPS access in PC utilities and setting the menu is necessary.

According to the PIN number scheme, a PIN number of an AP is first input to a client device or a PIN number of the client device is first input to the AP. A verification is then performed using the input PIN number, configuration information of the AP is then transferred to the client, and the client then accesses the AP by using the transferred configuration information.

In the PIN number scheme, a PIN number allocated to the AP or a PIN number randomly generated each time in the AP should be input to a client device. That is, in order to connect the client device to the AP, the client device is required to acquire the PIN number of the AP, and it is possible to establish a wireless LAN configuration through the WPS. In order to acquire or input the PIN number, it is necessary to access a WEB management or to operate a PC utility and input corresponding contents to the PC utility.

As described above, although the WPS provides a function enabling an easier configuration than the wireless LAN configuration of the related art, the WPS still requires a series of processes.

Therefore, the present disclosure proposes a scheme enabling a User Equipment (UE) to automatically access an AP.

FIG. 1 is a block diagram illustrating a UE according to an exemplary embodiment of the present invention.

Referring to FIG. 1, the UE includes a scanner 101, a determiner 103, and a configurator 105.

The scanner 101 determines if a dongle has been inserted in a PC, receives beacon messages from surrounding APs, and performs scanning.

The determiner 103 detects an AP, a WPS button of which has been pressed, from among one or more scanned APs, and enables the user to identify the connection or disconnection of the corresponding AP. In order to enable the user to identify the connection or disconnection of the corresponding AP, the determiner 103 may display the connection or disconnection of the AP on a screen or may inform the user of the connection or disconnection through an alarm function. In addition, various additional methods may be used for the user to identify the connection or disconnection of the corresponding AP. Further, when there are two or more accessible APs, the determiner 103 determines if one of the two or more APs is selected by an input of the user.

The configurator 105 connects with an AP selected by the input of the user and a wireless LAN.

The following description is based on the assumption that a typical wireless LAN USB dongle is used among various applicable products.

Figure 2:
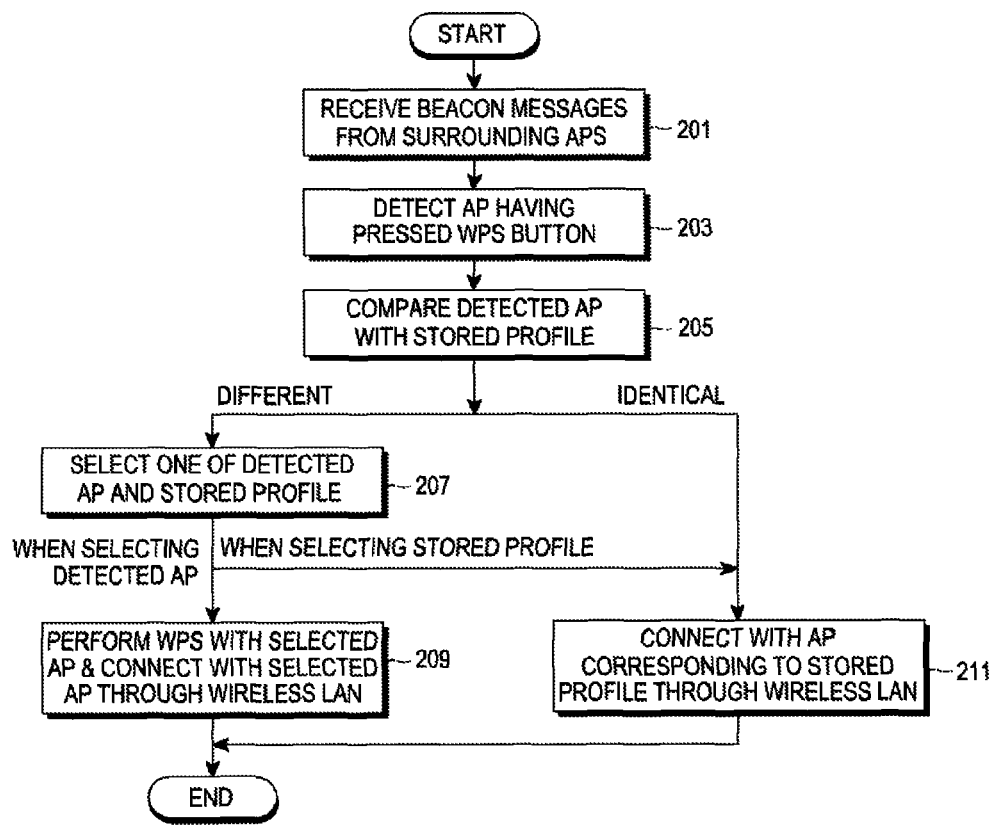
FIG. 2 is a flowchart illustrating an automatic connection process in a wireless communication system according to an exemplary embodiment of the present invention.

FIG. 2 is a flowchart illustrating an automatic connection process in a wireless communication system according to an exemplary embodiment of the present invention.

Referring to FIG. 2, in step 201, the scanner 101 determines that a dongle has been inserted in a PC, and performs scanning by receiving beacon messages from surrounding APs. In step 203, the determiner 103 detects an AP, a button to enable WPS of which has been pressed, among one or more scanned APs. In step 205, the determiner 103 compares the detected AP with a stored profile. As a result of the comparison, if the detected AP is different from the stored profile, the configurator 105 displays the result of the comparison so that one of the detected AP and the stored profile can be selected in step 207. When the detected AP has been selected, the configurator 105 performs WPS with the selected AP in step 209. More specifically, the configurator 105 transmits a message including the Medium Access Control (MAC) address of the selected AP by the input of the user to the selected AP, and performs WPS with the selected AP, to thereby access the wireless LAN.

If the stored profile has been selected in step 207, the configurator 105 connects with the AP corresponding to the stored profile and the wireless LAN in step 211.

Meanwhile, as a result of the comparison, if the detected AP is identical to the stored profile, the configurator 105 proceeds to step 211, in which the configurator 105 connects with the AP corresponding to the stored profile and the wireless LAN.

Figure 3:
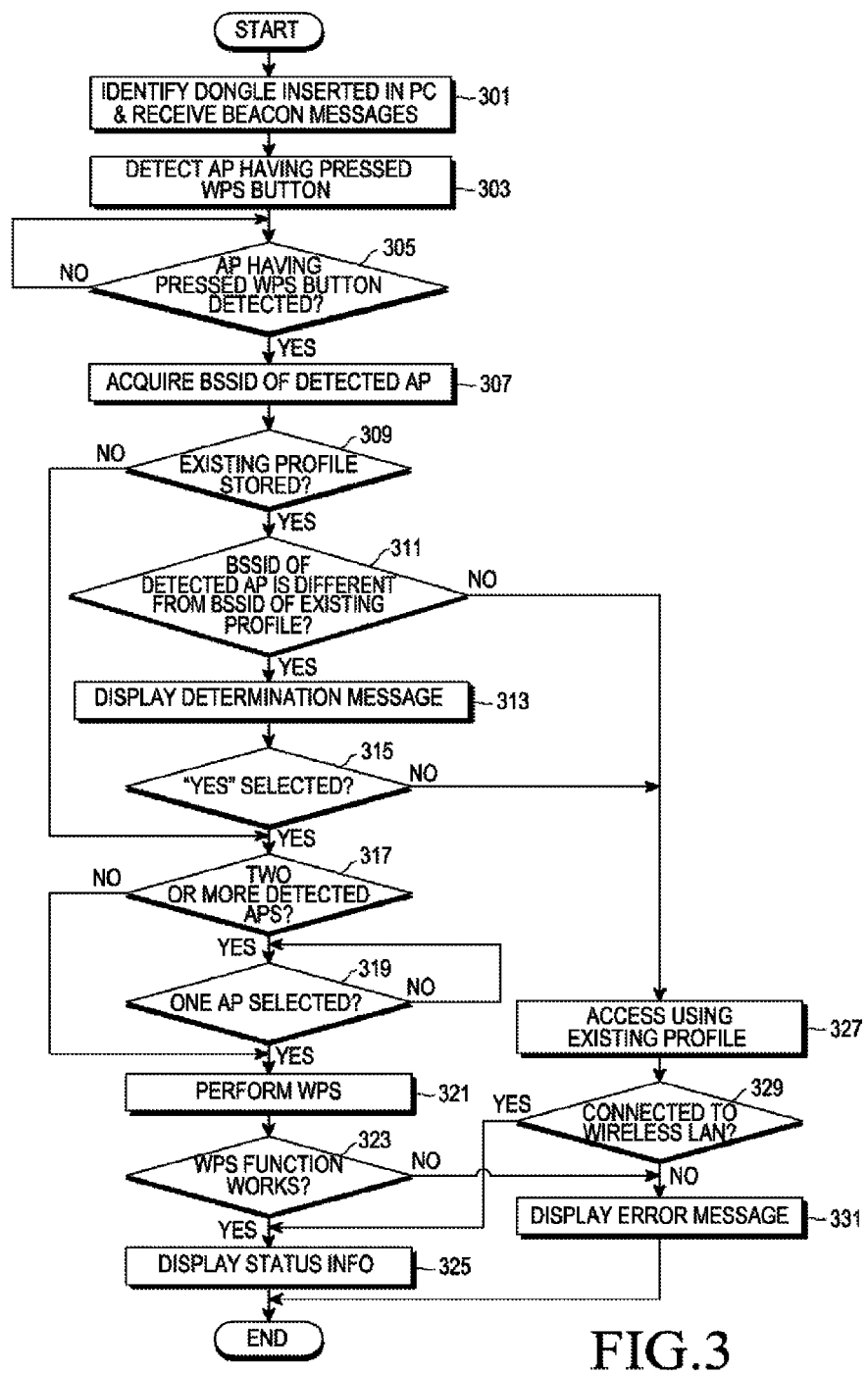
FIG. 3 is a flowchart illustrating an automatic connection process in a wireless communication system according to an exemplary embodiment of the present invention.

FIG. 3 is a flowchart illustrating an automatic connection process in a wireless communication system according to an exemplary embodiment of the present invention.

Referring to FIG. 3, in step 301, the scanner 101 identifies that a dongle has been inserted in a PC, and performs scanning by receiving beacon messages from surrounding APs. In step 303, the determiner 103 detects an AP, a button to enable WPS of which has been pressed, among one or more scanned APs. In step 305, the determiner 103 determines if an AP, a WPS button of which has been pressed, is detected. There may be more than one AP, a WPS button of which has been pressed. If it is determined in step 305 that a WPS button of an AP has been pressed, the WPS element information changes as follows.

WPS Element ID: 221
OUI: 00 50 F2 04
Attribute ID: 10 12
Attribute Length: 00 02
PBC value: 00 04

Therefore, the determiner 103 identifies information on whether the WPS button of the AP has been pressed, through WPS element information in a beacon packet occurring in a corresponding AP.

When an AP, a WPS button of which has been pressed, is not detected, the determiner 103 repeatedly performs step 305. When an AP, a button to enable WPS of which has been pressed, is detected, the determiner 103 proceeds to step 307, in which the determiner 103 acquires a Basic Service Set Identifier (BSSID) of the detected AP. In step 309, the determiner 103 determines whether the PC stores an existing profile. If the PC stores an existing profile, the determiner 103 determines if a BSSID of the detected AP is different from a BSSID of the existing profile in step 311. When the BSSID of the detected AP is different from the BSSID of the existing profile, the configurator 105 displays a selection message in step 313. The displayed selection message is provided for the user to determine whether to perform a WPS with the detected AP to access the wireless LAN or to use the existing profile to access the wireless LAN.

If "YES" has been selected (that is, when the detected AP is used) in the determination in step 315, the determiner 103 determines if there are two or more detected APs in step 317. When there are two or more detected APs, the configurator 105 determines if one AP is selected by the user from the detected APs in step 319. Then, the configurator 105 repeatedly performs step 319 until one AP is selected by the user from the detected APs. When one AP has been selected by the user from the detected APs, the configurator 105 accesses the wireless LAN by performing WPS with the selected AP by transmitting a probe request including a MAC address of the selected AP to the selected AP in step 321. As a result of the determination in step 317, when one AP has been selected, the configurator 105 omits step 319 and directly proceeds to step 321.

Thereafter, in step 323, the determiner 103 determines if the WPS function works. When the WPS function works, the configurator 105 displays the status information in step 325. When the WPS function does not work, the configurator 105 displays an error message in step 331.

In the meantime, as a result of the determination in step 309, when the PC does not store an existing profile, steps 317 to 331 as described above are performed.

As a result of the determination in step 311, when the BSSID of the detected AP is identical with the BSSID of the existing profile, the configurator 105 accesses the wireless LAN by connecting with a corresponding AP stored in the existing profile in step 327. In step 329, the determiner 103 determines if the terminal has been connected to the wireless LAN. When the terminal has been connected to the wireless LAN, the configurator 105 displays the status information in step 325. When the terminal is not connected to the wireless LAN, the configurator 105 displays an error message in step 331.

When "NO" has been selected (that is, when the user has selected to use the existing profile) in step 315, the operation in steps 327 to 331 as described above is performed.

Meanwhile, although not shown in the drawings, before execution of step 327, the determiner 103 may determine if there are two or more existing profiles, and may give the user an opportunity to select one of the two or more existing profiles when the two or more existing profiles exist.

According to the exemplary embodiments of the present disclosure as described above, when a user of a UE wants to use a wireless LAN, the UE can automatically connect to an AP without a separate process or special knowledge. Moreover, when there is an overlapping session, the UE can select and access a particular AP, so that it can easily configure a wireless LAN.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for automatic access in a wireless communication system, the apparatus comprising:
    a scanner configured to scan surrounding Access Points (APs) by receiving beacon messages from the APs;
    a determiner configured to detect an AP having a Wi-Fi Protected Setup (WPS) button which has been pressed from among one or more scanned APs and for determining if there are two or more detected APs; and
    a configurator configured to, when there are two or more detected APs, transmit a message including a Medium Access Control (MAC) address of an AP, which has been selected among the detected APs by an input of a user, to the selected AP and for performing a WPS with the selected AP, thereby accessing a wireless Local Area Network (LAN).

2. The apparatus of claim 1, wherein the determiner is configured to compare a Basic Service Set Identifier (BSSID) of the detected AP with a BSSID of a stored profile.

3. The apparatus of claim 2, wherein, when the BSSID of the detected AP is identical with the BSSID of the stored profile, the configurator is configured to connect with an AP corresponding to the stored profile and the wireless LAN.

4. The apparatus of claim 3, wherein, when there are two or more stored profiles, one profile, which includes the BSSID of the detected AP, is selected from the two or more stored profiles by another input of the user.

5. The apparatus of claim 2, wherein, when the BSSID of the detected AP is different from the BSSID of the stored profile, the configurator is configured to connect with one of the AP selected by the input of the user and the AP corresponding to the stored profile and with the wireless LAN.

6. The apparatus of claim 5, wherein the configurator is configured to display a message requesting user input to select connection with the one of the AP selected by the input of the user and the AP corresponding to the stored profile.

7. The apparatus of claim 1, wherein the message corresponds to a probe request message.

8. The apparatus of claim 1, wherein the two or more detected APs, the WPS button of each of which has been pressed, are detected through WPS element information included in the beacon messages.

9. A method for automatic access to an Access Point (AP) in a wireless communication system by a piece of User Equipment (UE), the method comprising:
    scanning surrounding APs by receiving beacon messages from the APs;
    detecting an AP having a Wi-Fi Protected Setup (WPS) button which has been pressed from among one or more scanned APs;
    determining if there are two or more detected APs; and
    when there are two or more detected APs, transmitting a message including a Medium Access Control (MAC) address of an AP, which has been selected among the detected APs by an input of a user, to the selected AP and performing a WPS with the selected AP, thereby accessing a wireless Local Area Network (LAN).

10. The method of claim 9, wherein the determining if there are two or more detected APs comprises comparing a Basic Service Set Identifier (BSSID) of the detected AP with a BSSID of a stored profile.

11. The method of claim 10, wherein, when the BSSID of the detected AP is identical with the BSSID of the stored profile, the accessing of the wireless LAN comprises connecting with an AP corresponding to the stored profile and the wireless LAN.

12. The method of claim 11, wherein, when there are two or more stored profiles, one profile, which includes the BSSID of the detected AP, is selected from the two or more stored profiles by another input of the user.

13. The method of claim 10, wherein, when the BSSID of the detected AP is different from the BSSID of the stored profile, the accessing of the wireless LAN comprises connecting with one of the AP selected by the input of the user and the AP corresponding to the stored profile and with the wireless LAN.

14. The method of claim 13, further comprising displaying a message requesting user input to select connection with one of the detected AP selected by the input of the user and the AP corresponding to the stored profile.

15. The method of claim 9, wherein the message corresponds to a probe request message.

16. The method of claim 9, wherein the two or more detected APs, the WPS button of each of which has been pressed, are detected through WPS element information included in the beacon messages.

* * * * *